Oct. 7, 1952 R. E. DOW 2,612,680
TAPER TURNING ATTACHMENT FOR TURRET LATHES
Filed April 7, 1950

INVENTOR.
Robert E. Dow
BY

Patented Oct. 7, 1952

2,612,680

UNITED STATES PATENT OFFICE 2,612,680

TAPER TURNING ATTACHMENT FOR TURRET LATHES

Robert E. Dow, Longmeadow, Mass.

Application April 7, 1950, Serial No. 154,546

2 Claims. (Cl. 29—57)

This invention relates to improvements in tools and is directed more particularly to apparatus adapted to facilitate the machining of a piece of work on an angle or taper.

The principal objects of the invention are directed to the provision of apparatus which is particularly useful for use with a turret lathe or the like and adapted to modify or supplement the cooperative action of the tool carrier means and turret relative to a rotating piece of work, thereby to provide a wider range of tapers or angles on the work piece, or to provide a certain predetermined angle or taper within a wide range.

The apparatus is adjustable to facilitate the forming of angles within a wider range than is possible with ordinary machines and is not only simple in form so as to be economical to manufacture but is efficient in operation and easily and readily associated with a turret-lathe or the like for its function.

As is well known a common form of turret-lathe has a turret slidable back and forth longitudinally relative to the longitudinal axis of the rotating work and a cross slide which is slidable parallel to the direction of movement of the turret with a tool holder or post slidable on the cross slide transversely relative to the longitudinal movement of the turret and cross slide. Separate feed means is provided for moving the turret longitudinally and forwardly towards the work and for moving the tool holder on the cross slide transversely of the movement of the turret.

The feed or rate of movement of the turret and of the tool holder are in certain definite portions of an inch per revolution of the work piece. As an example, some of the feeds of the longitudinal feed of the turret are .030", .018", .012" and some of the feeds of the tool holder feeding mechanism are .0025", .004", .017".

In turning a taper or angle on the rotating work piece with a tool in the tool holder, the speed mechanisms for the turret and for the tool holder are set for certain feeds or rates of movement. In operation the turret being actuated longitudinally by its feed mechanism engages the cross slide and propels it towards the rotating work while at the same time the tool holder is moved by its feed mechanism transversely.

The movement longitudinally of the turret and cross slide and simultaneous movement transversely of the tool holder causes the tool carried by the holder to make an angular cut on the work piece.

The angle of the cut is dependent upon the relative rates of feed of the turret and of the tool holder. As an example, on a certain machine where the longitudinal feed of the turret (and of the cross slide) is .012" per revolution of the work and the transverse feed of the tool holder is .0025" the angle produced is 13° relative to the axis of rotation of the work piece.

As already stated, the different feeds for the turret and for the tool holder are in certain definite portions of inches relative to a revolution of the work. Different angles may be obtained by different combinations of feeds but there being relatively few certain definite feeds, it is not possible to combine feeds to produce any desired angle or taper. That is, the possible angles are limited to the possible combinations of feeds.

On the certain machine referred to, the feeds are such that the angles to be cut which are less or greater than the 13° referred to are 9° and 21°. Hence it is impossible to produce angles between 9° and 13° or between 13° and 21°.

According to this invention, apparatus is provided which is adapted for association with the turret and tool holder of a turret-lathe. Said apparatus is adjustable for modifying the rate of movement of the cross slide (carrying the tool holder) relative to the rate of movement of the turret by which it is propelled. In this way, any desired angle within a wide range of angles may be produced thereby increasing the capabilities of a machine which is normally limited by feed mechanisms having the certain fixed feed rates or feeding speeds.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figure 1:
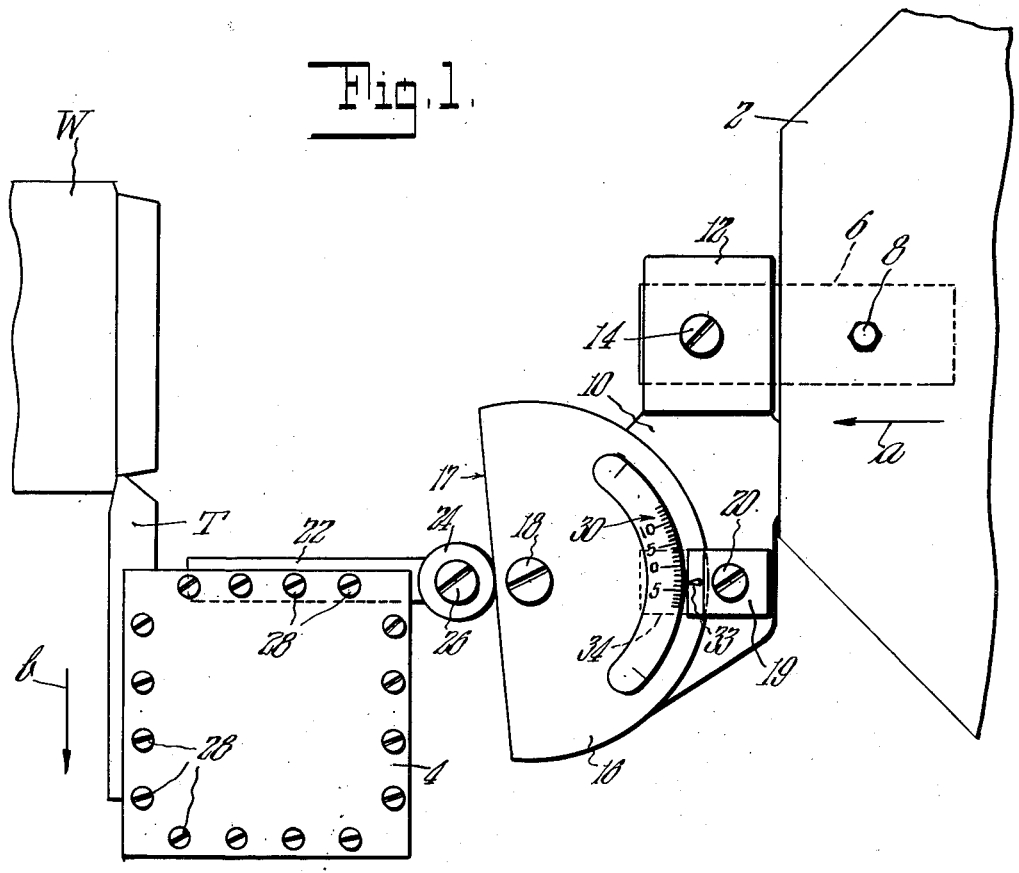
Fig. 1 is a plan view of the apparatus of the invention shown in association with portions of the turret and tool carrier of a turret-lathe and piece of work.
Figure 2:
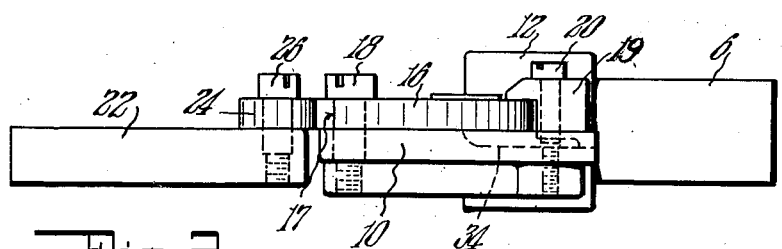
Fig. 2 is a side elevational view of the apparatus of the invention as shown in Fig. 1.
Figure 3:
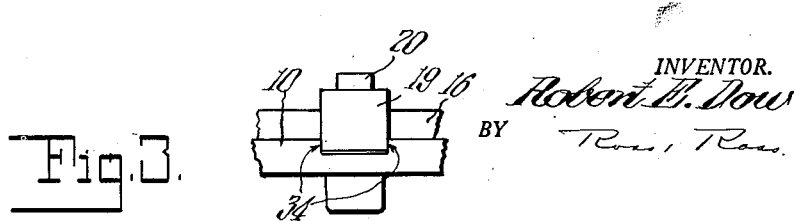
Fig. 3 is a rear elevational view of the cam clamp and a portion of said support.

Referring now to the drawings more in detail, the invention will be fully described.

A portion of the turret of a turret-lathe is represented by 2 which is movable longitudinally back and forth from left to right in the drawing. In the operation of a turret-lathe the turret is moved by feed mechanism to the left and towards a work piece represented by W in direction of arrow $a$.

A cross slide, not shown, is movable longitudinally in parallelism with the turret and a tool carrier means or tool post represented by 4 is movable back and forth on the cross slide and transversely relative to movement of the turret by its feed mechanism. The tool post has a tool T therein. The turret-lathe is not shown more in detail because not a part of this invention.

As the turret-lathe is operated normally in one way, the turret is moved longitudinally by its feed mechanism in direction of arrow $a$ towards the work and it engages and propels the cross slide in the same direction whilst the tool holder is moved in direction of arrow $b$ by its feed mechanism. This brings about an angular movement of tool T relative to the work according to the relative rate of feed of the feed mechanisms.

The turret 2 is usually provided with angularly disposed holes in one of which a shank 6 of the apparatus is inserted and held in place by any suitable means such as a set screw, clamp bolt or the like indicated by 8.

A support 10 has a hub 12 which receives the outer end of shank 6 and may be secured thereto by any suitable means such as a bolt or screw 14. Otherwise the shank and support may be integral if desired.

A cam member 16 is oscillatable on a member 18 carried by the support 10 and its periphery is disposed below the forward end of a clamp member 19.

A clamp screw 20 extending through the clamp member 19 and in engagement with the support and acting on the clamp holds cam member 16 in adjusted positions against oscillation.

A roll carrier 22 is provided which has a cam roll or follower 24 rotatable on a stud 26 at its outer end. The carrier 22 may be clamped in the member 4 by screws 28 as is the tool T.

One side 17 of the cam member 16 is preferably straight for engagement with roll 24 and said cam carries a plurality of graduations 30 which are registrable with an indexing means such as an arrow 33 of clamp 19. The graduations and index facilitate setting the cam in desired predetermined adjusted positions.

The rear lower end of the clamp 19 is disposed in a slot or groove 34 of the support 10 whereby it is held against turning on member 20.

The apparatus is associated with the turret 2 and tool post as shown. With the work piece in rotation, the feed mechanism is adjusted to move the turret towards and longitudinally of the work piece as though the turret was to move the cross slide also towards and longitudinally of the work.

The feed mechanism for the tool post is adjusted to move the said tool post on the cross slide inwardly towards the work piece transversely to the axis of rotation thereof.

The cam 16 is secured in adjusted position and the face 17 of said cam engages roll 24 so that as the turret moves in direction of arrow $a$ the cross slide is moved in a corresponding direction through the tool post.

The cam 16 in an adjusted position is interposed between the turret and tool post so that the cross slide is now propelled longitudinally through the tool post rather than being propelled directly by the turret.

With the turret moving in direction of arrow $a$ and at a predetermined rate of speed and the tool post moving in direction of arrow $b$, at a predetermined rate on the cross slide according to the arrangement of the parts shown, the cross slide and thereby the tool post and tool are moved longitudinally at a less rate than is the turret. Thereby the tool produces a different angle of cut than would be the case if the turret propelled the cross slide directly.

By selecting certain speeds for the turret and for the tool post within the capabilities of the turret lathe, and by adjusting the cam to a certain position, it is possible to provide the angle desired.

The angle of the cut is dependent on the feeding speeds of the turret and of the tool holder and the adjustment of the cam which brings about longitudinal movement of the tool relative to the longitudinal movement of the turret.

In the arrangement of the parts shown, the tool post and cross slide are moved longitudinally by the turret at a less rate than the turret is being moved by its feed mechanism.

Obviously the components may be related for action on the interior of a work piece or on a side opposite to that shown, all as may be desired.

The apparatus is easily and readily associated with the turret and tool carrier of a turret-lathe or the like, thereby making it possible for such a machine to perform operations not possible heretofore.

While the apparatus of the invention has been described in connection with a turret-lathe where a turret is fed towards a rotating piece of work and the tool carrying means is fed transversely thereto, it will be understood that the novel features of the invention are not to be limited thereto.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for association with the turret and tool carrying means of a turret lathe wherein said turret is fed longitudinally at a predetermined rate towards a rotating work piece and in parallelism with the axis of rotation thereof and said tool carrying means includes a tool post which is fed at a predetermined rate transversely to said axis on a slide which is movable in parallelism with the direction of movement of said turret comprising, a support for securement in said turret, a cam having a substantially straight longitudinal edge cam face, pivotal connections between said cam and support arranged whereby said cam face may be disposed in various fixed transverse horizontal planes relative to the longitudinal movement of said turret, means for clamping said cam to said support in adjusted fixed positions to locate the cam face horizontally and transversely relative to the direction of movement of the turret, a tool carried by said tool post for machining said work piece, and a holder adapted for securement in said tool post having a roll for engagement by said cam face whereby as said turret is fed forwardly towards said work piece said slide is moved in parallelism therewith through the tool post being fed outwardly and transversely on said slide.

2. Apparatus adapted for the turret and tool carrying means of a turret lathe wherein said turret is fed longitudinally at a predetermined rate towards and in parallelism with the axis of rotation of a piece of work and said tool carrying means consists of a tool post fed at a predetermined rate transversely to said axis on a slide which is normally moved towards said work piece by and in parallelism with the direction of movement of said turret to bring about movements of said slide at various rates relative to that of the turret comprising, a cam support for securement in said turret, a cam having substantially straight a longitudinal edge cam face, pivotal connections between said cam and cam support arranged whereby said cam may be positioned so that the cam face thereof is disposed horiontally in various fixed planes transverse to the direction of movement of the turret towards said work piece and to the axis of rotation of the work piece, means for securing said cam to said support in fixed adjusted positions, a tool carried by said tool post for machining a work piece, cam engaging means for securement in said tool post engageable by said cam face whereby as said turret moves towards said work piece said slide is moved in a corresponding direction through said cam and cam engaging means at a rate relative to the rate of movement of the turret according to the rate of transverse feed of the tool post and the disposition of the cam face relative to the direction of movement of said turret.

ROBERT E. DOW.

REFERENCES CITED

The following references are of record in the file of this patent:

UNITED STATES PATENTS

| Number | Name | Date |
| --- | --- | --- |
| 1,805,964 | Wallis | May 19, 1931 |

FOREIGN PATENTS

| Number | Country | Date |
| --- | --- | --- |
| 622,423 | Great Britain | May 2, 1949 |